United States Patent [19]
Kim

[11] Patent Number: 5,852,605
[45] Date of Patent: Dec. 22, 1998

[54] MATRIX TIME SWITCH APPARATUS CAPABLE OF PROVIDING CONTROL DATA FROM INLET TIME SWITCHES TO A MATRIX

[75] Inventor: Jae-Peoung Kim, Incheon, Rep. of Korea

[73] Assignee: Daewoo Telecom Ltd., Incheon, Rep. of Korea

[21] Appl. No.: 657,847

[22] Filed: May 31, 1996

[30] Foreign Application Priority Data

May 31, 1995 [KR] Rep. of Korea ................ 1995-14429

[51] Int. Cl.[6] ................................................. H04L 12/02
[52] U.S. Cl. ........................................... 370/371; 370/381
[58] Field of Search ..................................... 370/371, 369, 370/370, 375, 376, 380, 381, 382, 383, 377

[56] References Cited

U.S. PATENT DOCUMENTS

| | | | |
|---|---|---|---|
| 4,101,737 | 7/1978 | Philip ........................................ | 179/15 |
| 4,320,501 | 3/1982 | Le Dieu et al. ........................... | 370/63 |
| 4,380,064 | 4/1983 | Ishikawa et al. ......................... | 370/63 |
| 4,495,615 | 1/1985 | Wilcke ...................................... | 370/58 |
| 4,603,416 | 7/1986 | Servel et al. ............................. | 370/60 |
| 4,811,333 | 3/1989 | Rees .......................................... | 370/58 |

*Primary Examiner*—Chau Nguyen
*Assistant Examiner*—Thinh Vu
*Attorney, Agent, or Firm*—Pennie & Edmonds LLP

[57] ABSTRACT

A matrix time switch apparatus for use in a small capacity switching system comprises a matrix having N×N voice memories, N being a positive integer greater than 1, wherein each voice memory in each row of the matrix is attached to a corresponding time switch unit in a first group to simultaneously store subscriber data from the corresponding time switch unit in the first group and each voice memory in each column of the matrix is attached to a corresponding time switch unit in a second group to transmit the subscriber data retrieved from each voice memory in each column to the corresponding time switch unit in the second group, and a set of N control memories, wherein each control memory controls the transmission of the subscriber data retrieved in a voice memory selected in the column.

5 Claims, 1 Drawing Sheet

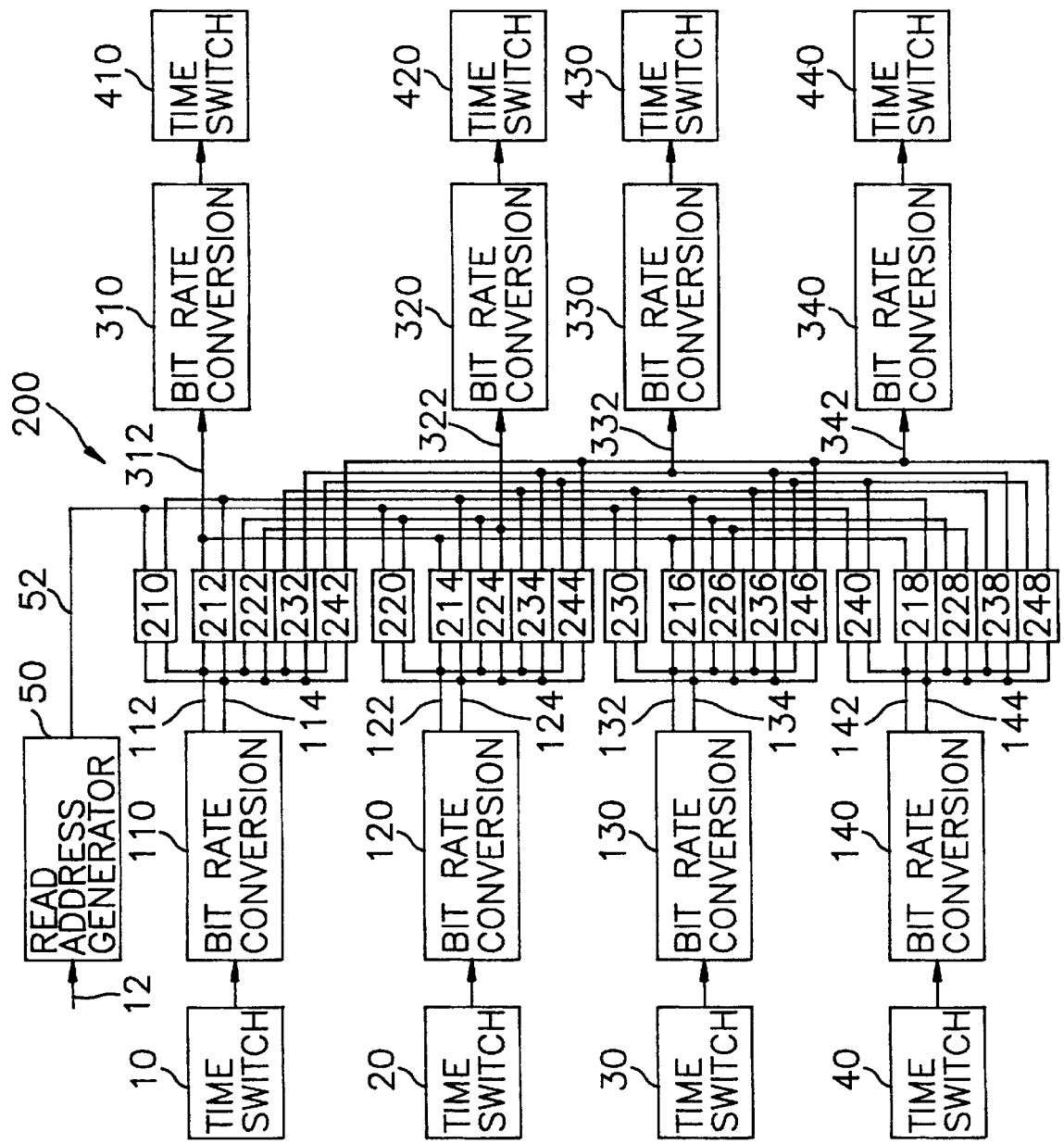

MATRIX TIME SWITCH APPARATUS CAPABLE OF PROVIDING CONTROL DATA FROM INLET TIME SWITCHES TO A MATRIX

FIELD OF THE INVENTION

The present invention relates to a matrix time switch apparatus for a small capacity switching system; and, more particularly, to a matrix time switch apparatus having a matrix time switch unit for interfacing any pair of two time switch units incorporated in the matrix time switch apparatus.

DESCRIPTION OF THE PRIOR ART

As is well known, a matrix time switch apparatus is mainly employed to construct a network of a small capacity switching system capable of accommodating up to a maximum of 2,000 subscriber channels. Such a matrix time switch apparatus includes a first group of N time switch units for continuously producing subscriber data, for each clock pulse, a second group of N time switch units for receiving the subscriber data, a matrix time switch unit for interfacing therebetween and a set of N decoders.

The matrix time switch unit has a matrix of an N×N buffers, wherein N buffers in each row of the matrix is attached to a corresponding time switch unit in the first group and N buffers in each column of the matrix is attached to a corresponding time switch unit in the second group. Each of the N buffers in the row simultaneously stores the subscriber data from the corresponding time switch unit in the first group.

Each of the decoders is associated with the N buffers in each row, which serves to selectively active one of the buffers in the row for each clock pulse. Accordingly, when a particular one of N buffers in the row is activated by the decoder, the subscriber data is retrieved from the activated buffer in the row and the retrieved subscriber data is provided to the corresponding time switch unit in the second group. Subsequentially, the subscriber data produced from a particular time switch unit in the first group can be transferred to a particular time switch unit in the second group.

However, since, in the prior art time switch apparatus, the switching of the subscriber data is independently performed by each of the decoders, there is a possibility for a data collision, wherein two or more subscriber data in a same column are simultaneously retrieved by their corresponding decoders at a same time, which results in a cross.

SUMMARY OF THE INVENTION

It is, therefore, an object of the present invention to provide a time switch apparatus having a matrix time switch capable of avoiding a data collision.

In accordance with the present invention, there is provided a matrix time switch apparatus for use in a small capacity switching system comprising: a first group of N time switch means, each time switch means producing subscriber data and control data, N being a positive integer greater than 1; a second group of N time switch means, each time switch means receiving the subscriber data; a matrix having N×N voice memories for interchanging the subscriber data between each pair of the time switch means in the first and the second group, each voice memory in each row of the matrix is attached to a corresponding time switch means in the first group to simultaneously store the subscriber data from said corresponding time switch means in the first group and each voice memory in each column of the matrix is attached to a corresponding time switch means in the second group to transmit the subscriber data retrieved from said each voice memory in said each column to said corresponding time switch means in the second group; and a set of N control memories, wherein each control memory stores the control data produced from said each of the N time switch means in the first group and controls the transmission of the subscriber data retrieved in said each voice memory in said each column to said corresponding time switch means in the second group through the use of the control data, wherein the control data includes a selection signal used to select one of the voice memories in the column and a read address signal used to retrieve the subscriber data from the voice memory selected in the column.

BRIEF DESCRIPTION OF THE DRAWINGS

The above and other objects and features of the present invention will become apparent from the following description of preferred embodiments, when taken in conjunction with the accompanying drawing wherein a single figure shows a block diagram of a matrix time switch apparatus in accordance with the present invention.

DETAILED DESCRIPTION OF THE PREFERRED EMBODIMENTS

Referring to a single drawing, there is shown a block diagram of a matrix time switch apparatus in accordance with the present invention, which serves as an N×N time slot interchanger, N being a positive integer greater than 1. For the sake of simplicity, the inventive apparatus will be described for the case of N being equal to be four (4) in the following, unless otherwise specified exclusively.

The matrix time switch apparatus includes a first group of four time switch units 10, 20, 30, 40, a read address generator 50, a first set of four bit rate conversion sections 110, 120, 130, 140, a matrix time switch unit 200, a set of four control memories 210, 220, 230, 240, a second set of four bit rate conversion sections 310, 320, 330, 340 and a second group of time switch units 410, 420, 430, 440.

The read address generators 50 receives from an appropriate clock means (not shown) a clock signal via a line 12 to generate a read address signal on an address line 52 and a synchronization clock for synchronizing all of the components of the matrix time switch apparatus.

Each of the time switch units 10, 20, 30, 40 provides parallel 12-bit by serial 2-bit control and subscriber data, at 16.384 Mbps, for each clock pulse, to each of the bit rate conversion sections 110, 120, 130, 140, respectively.

In each of the bit rate conversion sections 110, 120, 130, 140, both the control and the subscriber data are converted into a format of parallel 24-bit, at 8.192 Mbps, through the use of the clock signal, a parallel 13-bit for control data, a parallel 8-bit for subscriber data and a remaining 3-bit for decoding data, which will then be supplied to the matrix switch unit 200 and the control memories 210, 220, 230, 240, via corresponding data lines 112, 122, 132, 142, respectively. Further, each of the bit rate conversion sections 110, 120, 130, 140 is provided with a write address signal generator (not shown) which, in response to a clock signal provided from its corresponding time switch unit in the first group, sequentially produces a write address signal on corresponding address lines 114, 124, 134 and 144, respectively.

The matrix time switch unit 200 has a matrix of four by four voice memories, each of which may be of a 2K×8-bit dual port static random access memory (SRAM), wherein each of the conversion sections 110, 120, 130, 140 in the first set is attached to four voice memories in each row of the matrix and each of the conversion sections 310, 320, 330, 340 in the second set is attached to four voice memories in each column of the matrix. Each of four voice memories in each row stores simultaneously the same 8-bit parallel subscriber data from each of the corresponding bit rate conversion sections 110, 120, 130, 140 in the first group in accordance with the write address signal, for each clock pulse, respectively, in such a manner that the 8-bit parallel subscriber data from the first bit rate conversion section 110 is simultaneously written into each of the four voice memories 212, 222, 232, 242 on a first row in the matrix 200; the 8-bit parallel subscriber data from the second bit rate conversion section 120 is simultaneously written into each of the four voice memories 214, 224, 234, 244 on a second row in the matrix 200; the 8-bit parallel subscriber data from the third bit rate conversion section 130 is simultaneously written into each of the four voice memories 216, 226, 236, 246 on a third row in the matrix 200; and the 8-bit parallel subscriber data from the fourth bit rate conversion section 140 is simultaneously written into each of the four voice memories 218, 228, 238, 248 on a fourth row in the matrix 200.

Associated with each set of four voice memories on each column is each of the control memories 210, 220, 230, 240, which may be of a 2K×16-bit SRAM, for controlling the voice memories in the column in the matrix. Each of the four control memories 210, 220, 230, 240 stores the 13-bit parallel control data produced from each of the bit rate conversion sections 110, 120, 130, 140, respectively, through the use of the write address signal, for each clock pulse, in such a manner that the 13-bit parallel control data produced from the bit rate conversion section 110 is stored in the control memory 210, the 13-bit parallel control data produced from the bit rate conversion section 120 is stored in the control memory 220, the 13-bit parallel control data produced from the bit rate conversion section 130 is stored in the control memory 230, and the 13-bit parallel control data produced from the bit rate conversion section 140 is stored in the control memory 240.

The control data stored in the control memory 210, 220, 230, 240 is read out in accordance with the read address provided from the read address generator 50. The control data includes a 3-bit selection signal used to select one of the four voice memories in the column and a 10-bit read address signal used to retrieve the subscriber data from the voice memory selected in the column. Each of the control signals from the control memories 210, 220, 230, 240 is provided to the voice memories in each column, for each clock pulse.

Accordingly, one of the voice memories 212, 214, 216, 218 in a first column of the matrix 200 is selected by the control signal from the control memory 210; one of the voice memories 222, 224, 226, 228 in a second column of the matrix 200 is selected by the control signal from the control memory 220; one of the voice memories 232, 234, 236, 238 in a third column in the matrix 200 is selected by the control signal from the control memory 230; and one of the voice memories 242, 244, 246, 248 in a fourth column of the matrix 200 is selected by the control signal from the control memory 240.

And then, the subscriber data is retrieved from the selected voice memory in the first column of the matrix 200 and is loaded on an output line 312 connected to the bit rate conversion section 310; the subscriber data is retrieved from the selected voice memory in the second column of the matrix 200 and is loaded on an output line 322 connected to the bit rate conversion section 320; the subscriber data is retrieved from the selected voice memory in the third column of the matrix 200 and is loaded on an output line 332 connected to the bit rate conversion section 330; and the subscriber data is retrieved from the selected voice memory in the fourth column of the matrix 200 and is loaded on an output line 342 connected to the bit rate conversion section 340.

In each of the bit rate conversion sections 310, 320, 330, 340 in the second set, the parallel 8-bit subscriber data, at 8.196 Mbps, is converted into a format of parallel 5-bit by serial 2-bit, control and subscriber data at 16.384 Mbps. Each of the converted subscriber data is then provided to each of the time switch units 410, 420, 430, 440 in the second group, respectively.

While the present invention has been shown and described with respect to the preferred embodiments, it will be apparent to those skilled in the art that many changes and modifications may be made without departing from the spirit and scope of the invention as defined in the appended claims.

What is claimed is:

1. A matrix time switching apparatus for use in a small capacity switching system, comprising:

a first group of N time switch means, each time switch means producing subscriber data and control data, N being a positive integer greater than 1;

a second group of N time switch means, each time switch means receiving the subscriber data;

a matrix having N memory groups, each memory group having N voice memories, wherein all N voice memories of the ith memory group are coupled to an ith time switch means of the first group to store the subscriber data from the ith time switch means of the first group, i ranging from 1 to N, and the jth voice memory of all N memory groups is coupled to a jth time switch means of the second group to transmit the subscriber data retrieved therefrom, j ranging from 1 to N; and a set of N control memories, wherein a kth control memory of the N control memories is coupled with a kth time switch means of the first group to store the control data produced from the kth time switch means of the first group and is coupled with the kth voice memory in each of the N memory groups to control the transmission of the subscriber data retrieved therefrom to a kth time switch means of the second group through the use of the control data.

2. The apparatus of claim 1, wherein the control data includes a decode signal used to select one of the voice memories in the memory groups and a read address signal used to retrieve the subscriber data from the voice memory selected in the memory group.

3. A matrix time switching apparatus comprising: a switching matrix comprising N memory groups, each memory group having N voice memories, N being a positive integer greater than 1;

N control memories, the jth control memory being coupled to the jth voice memory in all N memory groups, j ranging from 1 to N;

N input time switch means, each of said N input time switch means arranged to produce subscriber data and control data, the ith input time switch means being coupled to all N voice memories in the ith memory group, and also to the ith control memory, i ranging from 1 to N; and N output time switch means, the jth output time switch means being coupled to the jth voice memory in all N memory groups; wherein control data produced by the ith input time switch means is written to the ith control memory, subscriber data produced by the ith input time switch means is written to all N voice memories in the ith memory group such that all N voice memories in the ith memory group contain identical data, and the jth output time switch means receives subscriber data from the jth voice memory in the kth memory group, k being determined by the control data written to the jth control memory.

4. The matrix time switching apparatus of claim 3, further comprising:

N input bit rate conversion means, the ith input bit rate conversion means arranged to receive subscriber data at a first bit rate from the ith input time switch means, and send said subscriber data at a second bit rate to all N voice memories of the ith memory group; and N output bit rate conversion means, the jth output bit rate conversion means arranged to receive said subscriber data at a third bit rate from the jth voice memory of a selected one of said N memory groups and send said subscriber data at a fourth bit rate to the jth output time switch means.

5. The matrix time switching apparatus of claim 3, wherein the subscriber data from the ith input time switch means is written to all N voice memories in the ith memory group simultaneously.

* * * * *